(12) United States Patent
Kim

(10) Patent No.: US 7,144,060 B2
(45) Date of Patent: Dec. 5, 2006

(54) DAMPER ASSEMBLY FOR A GLOVE BOX

(75) Inventor: Keun-chul Kim, Yongin-shi (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 10/744,006

(22) Filed: Dec. 24, 2003

(65) Prior Publication Data

US 2005/0104401 A1 May 19, 2005

(30) Foreign Application Priority Data

Nov. 19, 2003 (KR) .................. 10-2003-0082288

(51) Int. Cl.
*B60N 3/12* (2006.01)
(52) U.S. Cl. .................................. 296/37.12
(58) Field of Classification Search ............... 296/37.12
See application file for complete search history.

(56) References Cited

U.S. PATENT DOCUMENTS

| | | | | |
|---|---|---|---|---|
| 5,275,456 A * | 1/1994 | Ishii et al. | ............... | 296/37.12 |
| 5,289,962 A * | 3/1994 | Tull et al. | ................... | 224/549 |
| 5,520,313 A * | 5/1996 | Toshihide | ................... | 224/539 |
| 5,558,385 A * | 9/1996 | Gross et al. | ............. | 296/37.12 |
| 5,887,930 A * | 3/1999 | Klein | ..................... | 296/37.12 |
| 5,951,083 A * | 9/1999 | Bittinger et al. | ......... | 296/37.12 |
| 6,295,883 B1 * | 10/2001 | Tsukada et al. | ............ | 74/89.18 |
| 6,669,258 B1 * | 12/2003 | Kato | ........................ | 296/1.01 |
| 6,739,640 B1 * | 5/2004 | Schmidt et al. | .......... | 296/37.13 |
| 6,749,242 B1 * | 6/2004 | Park | ........................ | 296/37.12 |
| 2003/0080131 A1 * | 5/2003 | Fukuo | ........................ | 220/264 |

FOREIGN PATENT DOCUMENTS

| | | |
|---|---|---|
| JP | 2-71045 | 5/1990 |
| JP | 6-69004 | 9/1994 |
| JP | 2002250388 | * 9/2002 |
| KR | 1997-054283 | 10/1997 |
| KR | 2002-045110 | 6/2002 |

OTHER PUBLICATIONS

English Language Abstract of KR 1997-054283.
English Language Abstract of KR 2002-045110.
English Language Abstract of JP 2-71045.
English Language Abstract of JP 6-69004.

* cited by examiner

*Primary Examiner*—H Gutman
(74) *Attorney, Agent, or Firm*—Greenblum & Bernstein, P.L.C.

(57) ABSTRACT

A damper assembly for a glove box includes a fixing member attached to the rear part of a glove box, the fixing member having a fitting protrusion, and a damper having a fitting piece, through which the fitting protrusion is inserted, whereby the number of the parts of the damper assembly is reduced. The fixing member of the damper assembly is made of a plastic material, whereby instability of the glove box is prevented when the glove box is opened or closed.

5 Claims, 2 Drawing Sheets

DAMPER ASSEMBLY FOR A GLOVE BOX

RELATED APPLICATION

The present disclosure relates to subject matter contained in Korean application No. 2003-82288, filed on Nov. 19, 2003.

BACKGROUND OF THE INVENTION

1. Field of the Invention

The present invention relates to a damper assembly of a glove box, and more particularly to a damper assembly comprising a fixing member made of a plastic material and attached to the rear part of a glove box, the fixing member having a fitting protrusion, and a damper having a fitting piece, through which the fitting protrusion is inserted, whereby the number of parts in the damper assembly is reduced, and instability of the glove box is prevented when the glove box is opened or closed.

2. Description of the Related Art

Into the instrument panel of an automobile is generally mounted a glove box for storing small articles. The glove box is mounted into the instrument panel in front of the front passenger seat of an automobile. The glove box is pivotably moved to or away from the passenger seat so that the glove box can be opened or closed.

Specifically, the instrument panel disposed at the passenger seat of the automobile has a space defined therein, in which the glove box is mounted in such a manner that the glove box is pivotably attached to the instrument panel at the lower part of the glove box.

The instrument panel of the automobile is equipped with a locking unit for locking the glove box so that the glove box is not opened when fully inserted into the instrument panel.

The glove box is equipped with a damper for reducing the opening or closing speed of the glove box door when used while being pivotably moved. Such dampers are disclosed in Korean Unexamined Utility Model Publication No. 1997-054283, Korean Unexamined Patent Publication No. 2002-045110, Japanese Unexamined Utility Model Publication No. 1990-071045, and Japanese Unexamined Utility Model Publication No. 1994-069004.

The dampers disclosed in the above-mentioned documents are characterized in that each of the dampers is disposed on the side of the glove box, although the shapes and the fixing method of the dampers are different from each other.

When the damper is disposed at the side of the glove box, however, the storing capacity of the glove box is decreased.

Furthermore, the damper is exposed to the outside from the gap defined between the instrument panel and the glove box when the glove box is opened, which does not lend to an aesthetic appearance.

Recently, there has been adopted a structure in which the damper is fixed to the rear part of the glove box as shown in FIG. 1 in order to solve the above-mentioned problems.

FIG. 1 is a view showing a conventional damper assembly in which the damper is fixed to the rear part of the glove box. To the rear part of the glove box 11 is fixed a bracket 13 as shown in FIG. 1. At the glove box 11 are formed fixing holes 12, and at the bracket 13 are formed through-holes 14, which correspond to the fixing holes 12 of the glove box, respectively. The fixing holes 12 and the corresponding through-holes 14 are provided to increase the fixing between the glove box 11 and the bracket 13.

To the bracket 13 is attached a damper 15 in such a manner that a fixing pin 16 is connected to the damper 15 through the bracket 13.

The damper 15 is an air damper having a cylindrical body containing air therein. The damper 15 is linked to the glove box 11 and the instrument panel so that the opening or closing speed of the glove box 11 is controlled when the glove box 11 is used.

In the conventional damper assembly, however, the bracket is made of a metal material while the glove box is made of a plastic material resulting in increased tolerance distribution, and thus, instability of the glove box occurs when the glove box is opened or closed.

Furthermore, the cost of manufacturing the damper assembly is increased since the bracket is made of a metal material. Additionally, the weight of the damper assembly is also increased.

SUMMARY OF THE INVENTION

Therefore, the present invention has been made in view of the above problems, and it is an object of the present invention to provide a damper assembly of a glove box including a bracket made of a plastic material, not a metal material, wherein the plastic bracket is easily fixed to the damper without additional fixing parts so that instability of the glove box is effectively prevented, whereby the assembly operation and the manufacturing cost of the damper assembly are reduced.

In accordance with the present invention, the above and other objects can be accomplished by the provision of a damper assembly of a glove box, comprising: a fixing member fixed to the rear part of the glove box by means of screws, the fixing member having a fitting protrusion formed at one side thereof; and a damper having a fitting piece formed at one side thereof, the fitting protrusion being fitted in the fitting piece of the damper so that the damper is fixed to the fixing member.

According to the present invention, the number of the parts of the damper assembly is reduced. Also, the fixing member of the damper assembly is made of a plastic material, whereby instability of the glove box is prevented, and the manufacturing cost of the damper assembly is reduced.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
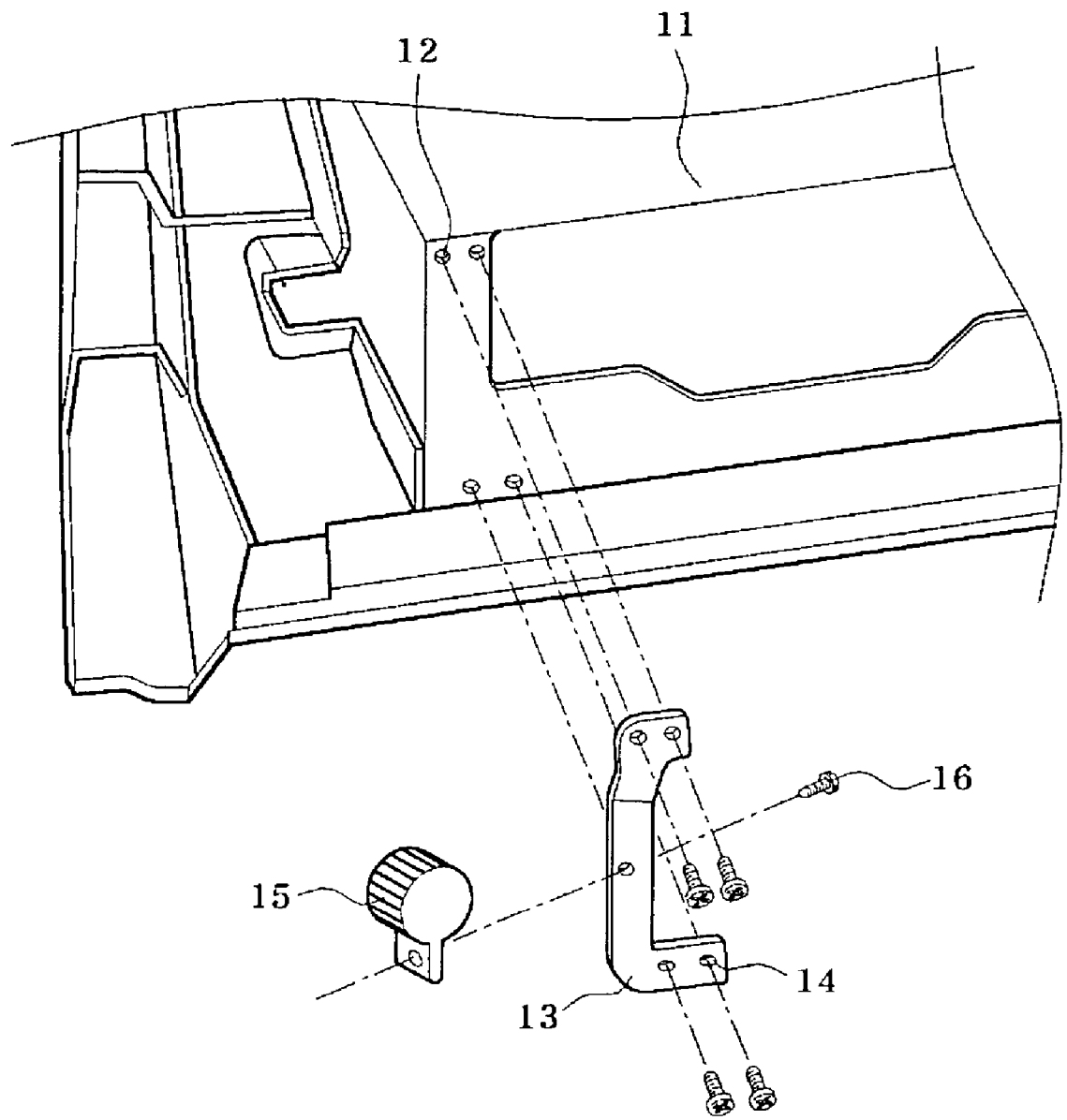
FIG. 1 is a view showing a conventional damper assembly in which a damper of the damper assembly is fixed to the rear part of a glove box.
Figure 2:
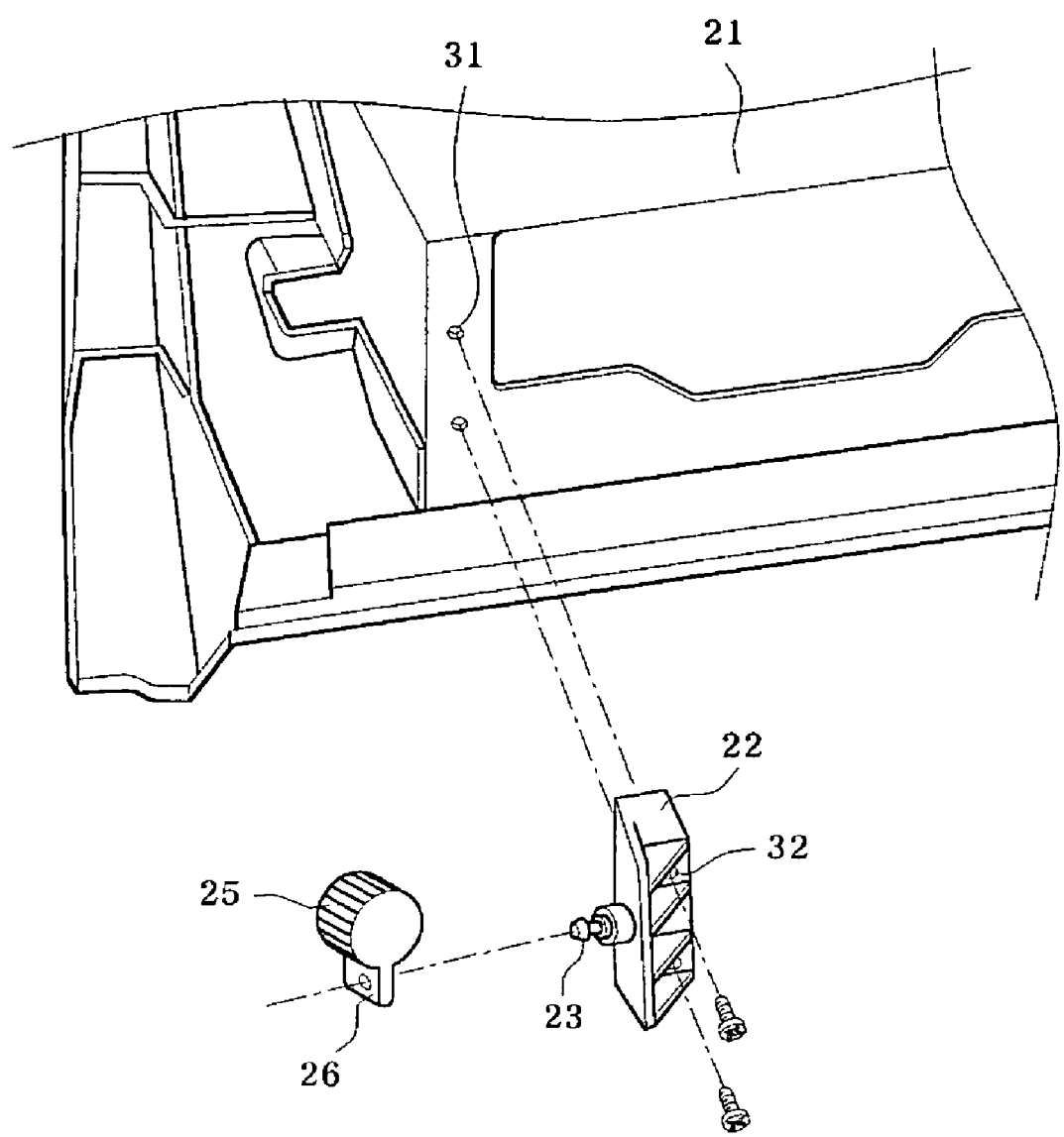
FIG. 2 is a view showing a damper assembly according to a preferred embodiment of the present invention in which a damper of the damper assembly is fixed to the rear part of a glove box.

FIG. 2 is a view showing a damper assembly according to a preferred embodiment of the present invention in which a damper 25 of the damper assembly is fixed to the rear part of a glove box 21.

To the rear part of the glove box 21 is fixed a fixing member 22 as shown in FIG. 2.

At the rear part of the glove box 21 are formed box holes 31, and at the fixing member 22 are formed screw holes 32, which correspond to the box holes 31, respectively. Specifically, the fixing member 22 is securely fixed to the rear part of the glove box 21 by means of screws, which are inserted into the box holes 31 through the screw holes 32.

At one side of the fixing member 22 is formed a fitting protrusion 23.

At one side of the damper 25 is formed a fitting piece 26, to which the fitting protrusion 23 is fixed.

The fitting protrusion 23 may be fixed to the fitting piece 26 by means of an additional fixing part. Preferably, the fitting protrusion 23 is fixed to the fitting piece 26 in such a manner that the fitting protrusion 23 is fitted in a hole or a groove formed at the fitting piece 26.

The fitting protrusion 23 is preferably integrated with the fixing member 22. The fixing member 22 is made of a plastic material.

The operation of the damper assembly according to the present invention will now be described.

The fitting protrusion 23 formed at one side of the fixing member 22 is fitted in the hole or the groove formed at the fitting piece 26 of the damper 25, and then the fixing member 22 equipped with the damper 25 is placed on the rear part of the glove box 21.

Afterwards, the fixing member 22 equipped with the damper 25 is securely attached to the rear part of the glove box 21 by means of screws or bolts while the box holes 31 formed at the glove box 21 are in line with the screw holes 32 formed at the fixing member 22.

The fixing member 22 is made of a plastic material. Consequently, instability of the glove box is prevented when the glove box is locked.

The damper 25 is fixed to the fixing member 22 without additional fixing parts, whereby the assembly operation is made easier and the manufacturing cost of the damper assembly reduced.

As apparent from the above description, the present invention provides a damper assembly of a glove box wherein a fitting protrusion for fixing a damper and a fixing member to each other is integrally formed with the fixing member, whereby the number of the parts of the damper assembly is reduced, and the cost of manufacturing the damper assembly is reduced.

Furthermore, the fixing member is made of a plastic material. Consequently, the weight of the damper assembly is reduced, and tolerance distribution is decreased when the damper assembly is fixed to the glove box, whereby instability of the glove box is prevented when the glove box is opened or closed.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A damper assembly of a glove box, comprising:
   a fixing member consisting of a plastic material and fixed to the rear part of the glove box, the fixing member having a fitting protrusion formed of the plastic material unitarily and in one piece with the fixing member at one side of the fixing member, the fitting protrusion including a tip portion extending longitudinally from an end of a shaft of the fitting protrusion, the tip portion having a diameter greater than a diameter of the shaft;
   a damper having a protruding fitting piece extending from one exterior side of the damper, the protruding fitting piece of the damper including a through hole,
   wherein the through hole is configured to receive the tip portion of the fitting protrusion.

2. The damper assembly according to claim 1, further comprising:
   a main body of the fixing member having a substantially rectangular prismatic shape and formed integrally with the one side with which the fixing member is formed; and
   a plurality of substantially planar support braces formed integrally with the fixing member and each orthogonal to both the one side of the fixing member and the substantially rectangular prismatic shape of the main body of the fixing member,
   wherein the damper is an air damper configured to contain air in an interior of the air damper.

3. The assembly as set forth in claim 1, wherein the fixing member is fixed to the rear part of the glove box by screws.

4. A damper assembly of a glove box, comprising:
   a fixing member formed of a plastic material and fixed to the rear part of the glove box, the fixing member having a fitting protrusion formed unitarily and in one piece with the fixing member at one side of the fixing member;
   a damper having a fitting piece extending from one exterior side thereof, the fitting protrusion being fitted in the fitting piece of the damper so that the damper is fixed to the fixing member; and
   an opening in the fitting piece of the damper,
   wherein the fitting protrusion has a substantially conical shape, a narrow end of which is insertable into the fitting piece of the damper, and
   wherein the fitting protrusion has a broad end which prevents the fitting protrusion from disengaging the fitting piece of the damper after the fitting protrusion is inserted into the fining piece such that the broad end passes completely through the opening of the fitting piece of the damper.

5. The assembly as set forth in claim 4, wherein the fixing member is fixed to the rear part of the glove box by screws.

* * * * *